June 17, 1969  J. R. MITCHELL  3,450,377
PARACHUTES
Filed Jan. 4, 1968
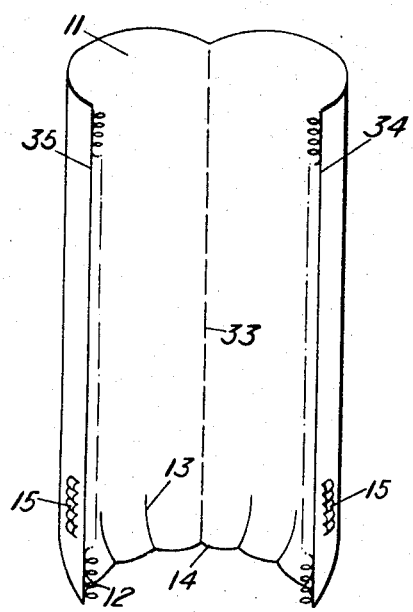
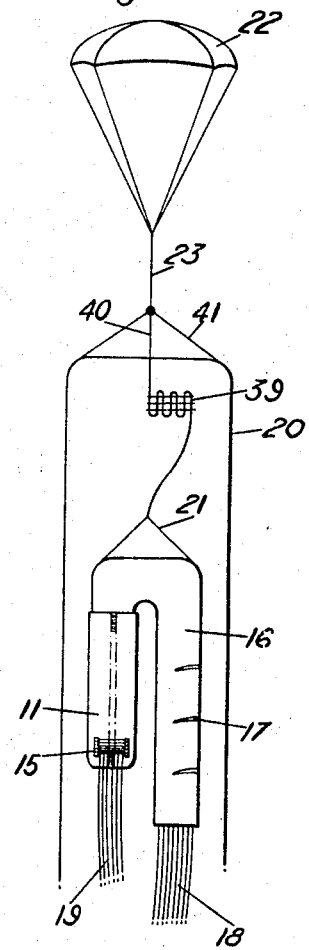
Inventor
JOHN ROTHWELL MITCHELL
By
Shoemaker and Mattare
Attorneys

United States Patent Office 3,450,377
Patented June 17, 1969

3,450,377
PARACHUTES
John Rothwell Mitchell, Woking, Surrey, England, assignor to G.Q. Parachute Company Limited, Woking, Surrey, England, a British company
Filed Jan. 4, 1968, Ser. No. 695,792
Claims priority, application Great Britain, Jan. 27, 1967, 4,130/67
Int. Cl. B64d 17/52, 17/62
U.S. Cl. 244—149                    5 Claims

ABSTRACT OF THE DISCLOSURE

A sleeve is provided around the nose of a parawing of substantially triangular shape which holds the nose reefed until the rear of the parawing has inflated, the sleeve having a readily openable fastener which is forced open as the rear of the parawing inflates to allow the sleeve to open and the nose of the parawing to inflate.

---

This invention relates to parachutes and particularly to parachutes having canopies of substantially triangular shape.

It has been found that when parachutes of this shape are deployed, the canopy spreads so rapidly that a high shock load is imparted to the parachutist. This shock load has been experienced with canopies of the two channel delta plan, sometimes called "parawings."

The object of this invention is to reduce this shock load. This is accomplished by delaying the inflation of the nose section of the canopy until the rear sections of the canopy are deployed. Control slots can be provided in the canopy which could relieve the initial pressures developed when the rear sections of the canopy are inflated.

Construction of such canopies necessitates the cutting off or rounding of the corners. This rounding off could produce shapes approximating to a parabola, ogive, semi-ellipse, or similar curve. The term "substantially triangular" in this specification and in the appended claims includes such rounded off shapes.

According to this invention, a parachute assembly comprises a canopy of substantially triangular shape, rigging lines for connecting the canopy to a load, such as a parachutist, and means for holding the nose section of the canopy in a reefed state until the rear sections of the canopy are deployed.

The invention also includes a parachute assembly comprising a canopy of substantially triangular shape, rigging lines for connecting the canopy to a load such as a parachutist, and means for holding the nose section of the canopy in a reefed state, the said means being provided with a fastener which holds the said nose section in its reefed state until the forces exerted on the fastener by the partly deployed rear sections of the canopy are sufficient to open the fastener.

The invention also comprises a sleeve for the nose section of a substantially triangular parachute canopy which has a fastener for holding the sleeve around the said nose section to keep the said nose section in a reefed state.

The sleeve can be provided with stowages for some or all of the rigging lines attached to the nose section of the canopy and the canopy can have control slots. An outer sleeve can be provided to house the canopy and the nose sleeve.

Figure 3:
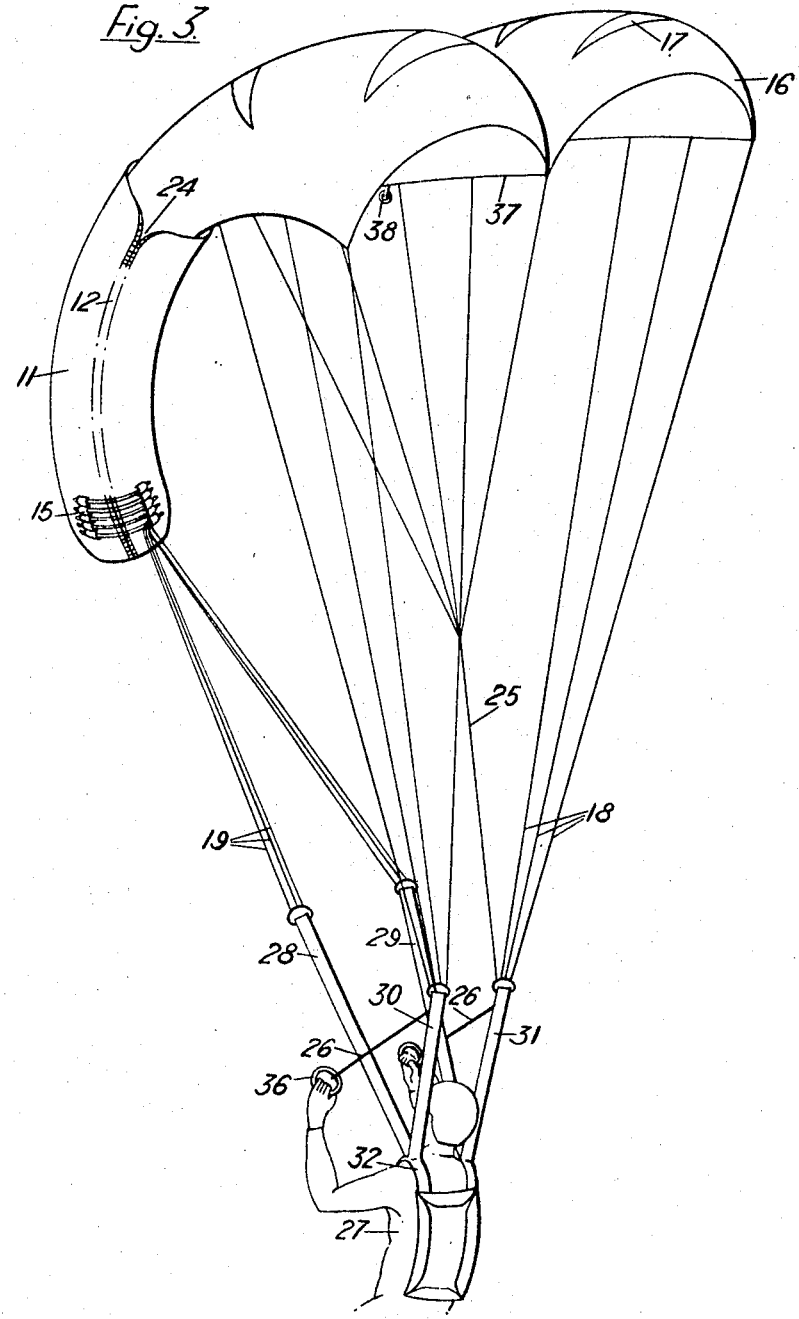
Figure 4:
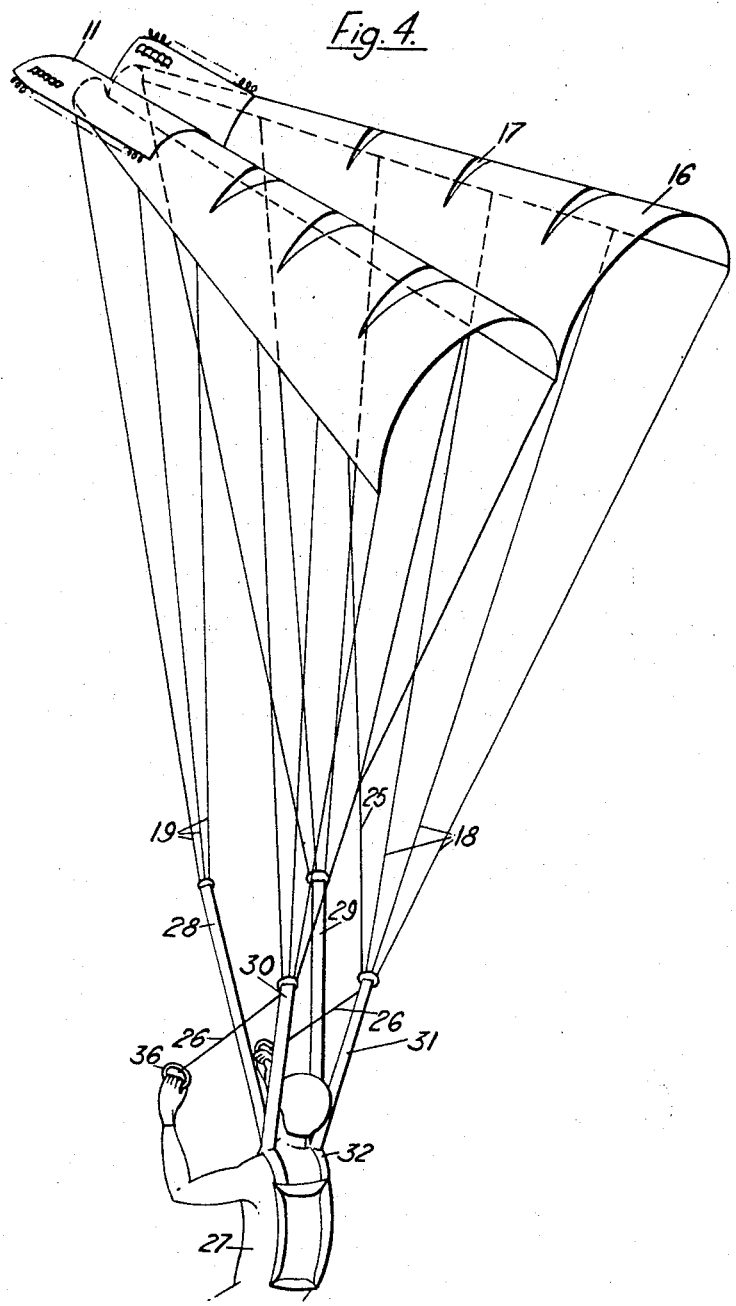

One form of parachute assembly according to the invention is described hereinafter with reference to the accompanying drawings of which FIGURE 1 illustrates a nose sleeve, FIGURE 2 illustrates a parachute assembly, and FIGURES 3 and 4 illustrate the assembly with the canopy partly and fully deployed respectively.

The assembly shown in FIGURE 2, comprises a canopy 16, which is of the double delta shape and has control slots 17, a sleeve 11 which surrounds the nose section of the canopy, an outer sleeve 20 which houses the whole canopy 16, an auxiliary parachute 22 and rigging lines 18 and 19.

The nose sleeve 11, shown in FIGURE 1, is provided with an easily openable fastener 12, such as a spiral slide fastener, connecting its two edges 34 and 35. Pleats or gathers 13 are provided along the nose edge 14 of the sleeve to reduce the length of this edge to that required to hold the nose of the canopy securely. Elastic loops 15 are provided at the nose end of the sleeve in which rigging lines 19 connected to the nose section of the canopy can be stowed. The sleeve is attached to the upper side of the nose of the canopy by any suitable means, such as stitching along the line 33.

An outer sleeve 20 is provided to house the canopy 16 and the sleeve 11. This outer sleeve 20 is provided with a bridle 41 which can be tied to strop 23 attached to the auxiliary parachute 22. The outer sleeve 20 has stowage loops 39 on its inner side in which strop 23 can be stowed.

The canopy 16 has a bridle 21 attached its upper side along the line of the keel 37. The strop 23 is connected to this bridle 21 and so connects the canopy 16 to the auxiliary parachute 22, the strop 23 being long enough to allow the auxiliary parachute 22 to draw the outer sleeve 20 from the canopy 16 to allow the canopy 16 to deploy.

The parachutist 27 is connected to the rear rigging lines 18 of the canopy 16 through risers 30 and 31 of his harness 32, and to the nose rigging lines 19 through risers 28 and 29. The lines 25 from the keel 37 of the canopy are connected to the rear risers 30 and 31 as are the lines to the control slots 17 which are extended by lines 26 to rings 36 within reach of the parachutist 27.

The fastener 12 is left by the packer of the parachute in a condition that it will open as soon as pressure is exerted on it by the opening of the rear sections of the canopy. If, for example, the fastener 12 is a slide fastener, the fastener lock 38 (FIG. 4) could be pulled from the end of the fastener by the packer, or it could be attached to the outer sleeve 20 so that the lock is pulled from the fastener by the auxiliary parachute, or it could be attached to the keel 37 of the canopy, as shown in FIGURE 4, in which case the lock 38 is pulled from the end of the fastener as the rear sections of the canopy deploy.

When the parachute is to be deployed, the auxiliary parachute 22 is deployed by the parachutist and this draws the sleeve 20 from the canopy 16. The rear sections of the canopy begin to deploy. When they are partly inflated they exert pressure on the end of the fastener 12 which is holding the nose sleeve 11 around the nose of the canopy. The fastener begins to open, as shown at 24, FIGURE 3. At the same time the nose rigging lines 19 deploy from the stowages 15. The nose of the canopy gradually inflates, from the rear end, forcing open the fastener 12. When the fastener is fully open, the nose sleeve 11 opens out, as shown in FIGURE 4. The sleeve 11 remains attached to the upper side of the canopy.

The invention is not restricted to the use of a slide fastener.

I claim:
1. A parachute assembly comprising a canopy of substantially triangular shape having rear sections and a nose section, rigging lines for connecting the canopy to a load such as a parachutist, an outer sleeve housing the canopy and rigging lines, means for removing the outer sleeve at the beginning of the fall of the load and allowing part deployment of the rear sections of the canopy, and an inner sleeve surrounding and holding the nose section of the canopy in a reefed state, the rear sections being free of the inner sleeve, the said inner sleeve being provided with a fastener which holds the said nose section in its reefed state until the forces exerted on the fastener by the partly deployed rear sections of the canopy are sufficient to open the fastener.

2. A parachute assembly as claimed in claim 1 in which the said fastener is a slide fastener.

3. A parachute assembly as claimed in claim 1 in which the sleeve is provided with stowages for rigging lines.

4. A parachute assembly as claimed in claim 2, in which the fastener is provided with a lock which is arranged to be removed from the fastener during the deployment of the canopy.

5. A parachute assembly as claimed in claim 1 in which the canopy is provided with control slots.

References Cited

UNITED STATES PATENTS

| | | | |
|---|---|---|---|
| 3,131,894 | 5/1964 | Jalbert | 244—45 |
| 3,198,458 | 8/1965 | Fink | 244—49 |
| 3,386,687 | 6/1968 | Rollins | 244—49 |

MILTON BUCHLER, *Primary Examiner.*

R. A. DORNON, *Assistant Examiner.*

U.S. Cl. X.R.

244—152